United States Patent
Love et al.

(10) Patent No.: US 8,379,601 B2
(45) Date of Patent: Feb. 19, 2013

(54) METHOD AND SYSTEM FOR SELECTIVE USE OF CONTROL CHANNEL ELEMENT BASED IMPLICIT POINTING

(75) Inventors: Robert T. Love, Barrington, IL (US); Vijay Nangia, Algonquin, IL (US)

(73) Assignee: Motorola Mobility LLC, Libertyville, IL (US)

( * ) Notice: Subject to any disclaimer, the term of this patent is extended or adjusted under 35 U.S.C. 154(b) by 462 days.

(21) Appl. No.: 12/178,754

(22) Filed: Jul. 24, 2008

(65) Prior Publication Data

US 2009/0046793 A1 Feb. 19, 2009

Related U.S. Application Data

(60) Provisional application No. 60/956,334, filed on Aug. 16, 2007.

(51) Int. Cl.
*H04J 3/00* (2006.01)
(52) U.S. Cl. ............... 370/334; 370/337; 370/468
(58) Field of Classification Search ............ 370/252, 370/331, 334, 335, 338, 342
See application file for complete search history.

(56) References Cited

U.S. PATENT DOCUMENTS

| | | | |
|---|---|---|---|
| 7,440,399 B2 * | 10/2008 | Julian et al. | 370/230 |
| 7,774,686 B2 * | 8/2010 | Ahn et al. | 714/776 |
| 7,804,800 B2 * | 9/2010 | Li et al. | 370/334 |
| 7,873,002 B2 * | 1/2011 | Cai | 370/329 |
| 8,165,035 B2 * | 4/2012 | Che et al. | 370/252 |
| 2005/0122898 A1 | 6/2005 | Jang et al. | |
| 2006/0133273 A1 | 6/2006 | Julian et al. | |
| 2007/0047502 A1 | 3/2007 | Marinier et al. | |
| 2007/0097981 A1 | 5/2007 | Papasakellariou | |
| 2007/0171849 A1 | 7/2007 | Zhang et al. | |
| 2008/0051125 A1 | 2/2008 | Muharemovic et al. | |
| 2008/0070582 A1 * | 3/2008 | Cai | 455/450 |
| 2008/0084853 A1 | 4/2008 | Kuchibhotla et al. | |

(Continued)

FOREIGN PATENT DOCUMENTS

| | | |
|---|---|---|
| EP | 1599403 A2 | 8/2005 |
| WO | 2004073200 A1 | 8/2004 |

(Continued)

OTHER PUBLICATIONS

NEC, Nokia, and Nokia Siemens Network, "Way Forward on Control Channels Multiplexing", TSG-RAN-WG1 #50bis, R1-074505, Oct. 8-12, 2007, pp. 1-3, Shanghai, China.

(Continued)

*Primary Examiner* — Dang Ton
*Assistant Examiner* — Brian O Connor
(74) *Attorney, Agent, or Firm* — Larry G. Brown; Sylvia Chen

(57) ABSTRACT

A method for selective use of control channel element (CCE)-based implicit pointing. The method includes the step of determining whether a number of multiple user elements (UE) within a multi-user multiple-input multiple-output (MU-MIMO) group is greater than the number of resource blocks allocated to the MU-MIMO group. If the number of UEs in the MU-MIMO group is greater than the number of resource blocks allocated to the MU-MIMO group, the method further includes transmitting to each of the UEs of the MU-MIMO group acknowledgements on acknowledgement channels within a first acknowledgement bank and acknowledgements on acknowledgement channels within a second acknowledgement bank. A first portion of the UEs of the MU-MIMO group receives the acknowledgements on the acknowledgement channels within the first acknowledgement bank and a second portion of the UEs of MU-MIMO group receives the acknowledgements on the acknowledgement channels within the second acknowledgement bank.

17 Claims, 8 Drawing Sheets

U.S. PATENT DOCUMENTS

| | | | |
|---|---|---|---|
| 2008/0117878 | A1 | 5/2008 | Kim et al. |
| 2008/0205348 | A1 | 8/2008 | Malladi |
| 2009/0103482 | A1 | 4/2009 | Imamura et al. |
| 2009/0109906 | A1 | 4/2009 | Love et al. |
| 2009/0196274 | A1 | 8/2009 | Rimini et al. |
| 2011/0194524 | A1 | 8/2011 | Hedlund et al. |

FOREIGN PATENT DOCUMENTS

| | | |
|---|---|---|
| WO | 2007148710 A1 | 12/2007 |
| WO | 2008085000 A1 | 7/2008 |
| WO | 2008133454 A | 11/2008 |
| WO | 2008137864 A | 11/2008 |

OTHER PUBLICATIONS

3rd Generation Partnership Project, "Technical Specification Group Radio Access Network; Evolved Universal Terrestrial Radio Access (E-UTRA); Physical Layer Procedures (Release 8)," 3GPP TS 36.213 V8.5.0, Dec. 2008, pp. 1-74, Sophia Antipolis, France.

Jim Zyren and Dr. Wes McCoy, "Overview of the 3GPP Long Term Evolution Physical Layer", Jul. 2007, pp. 1-27, Freescale Semiconductor.

Hyung G. Myung, "Technical Overview of 3GPP LTE", May 18, 2008, pp. 1-53.

3rd Generation Partnership Project, "Technical Specification Group Radio Access Network; Evolved Universal Terrestrial Radio Access (E-UTRA); Physical Channels and Modulation (Release 8)," 3GPP TS 36.211 V8.5.0, Dec. 2008, pp. 1-82; Sophia Antipolis, France.

Motorola, "PHICH Resource Signaling for TDD & FDD", 3GPP TSG RAN1 #52bis, R1-081286, Apr. 1-5, 2008, pp. 1-4, Shenzhen, China.

Patent Cooperation Treat, "International Search Report and Written Opinion of the International Searching Authority" for International Application. No. PCT/US2010/022485, May 18, 2010, 15 pages.

NTT Docomo et al., "ACK/NACK Signal Structure in E-UTRA Downlink" (3GPP TSG RAN WG1 Meeting #48, R1-070867, Original R1-063326), Feb. 12-16, 2007, 4 pages, St. Louis USA.

Motorola, "MU-MIMO PHICH Assignment for Adaptive and Non-Adaptive HARQ" (3GPP TSG RAN1 #50, R1-073409), Aug. 20-24, 2007, 4 pages, Athens Greece.

Motorola, "E-UTRA DL L1/L2 Control Channel Format for SIMO & MIMO" (3GPP TSG RAN WG1 #49bis R1-072697), Jun. 25-29, 2007, 7 pages, Orlando USA.

Motorola et al., "Way Forward for DL Resource Allocation Mapping" (3GPP TSG RAN WG1 #49bis, R1-073227), Jun. 25-29, 2007, 4 pages, Orlando USA.

Motorola, "Downlink Resource Allocation Mapping for E-UTRA" (3GPP TSG RAN1 #50, R1-073372), Aug. 20-29, 2007, 5 pages, Athens Greece.

Ericsson, "Begin-End representation of scheduling allocations" (3GPP TSG RAN WG1 #49bis, R1-073052), Jun. 25-29, 2007, 2 pages, Orlando USA.

Samsung, "Resource Indication Scheme for Downlink Packet Scheduling" (3GPP TSG RAN WG1 #49bis, R1-073119), Jun. 25-29, 2007, 4 pages, Orlando USA.

Nokia and Nokia Siemens Networks, "Signalling and Decoding of PRB Allocations LTE Downlink" (3GPP TSG RAN WG1 #49bis, R1-072997), Jun. 25-29, 2007, 5 pages, Orlando USA.

NEC Group, "DL Unicast Resource Allocation Signalling Using L1L2 Control Channels" (3GPP TSG RAN WG1 #49bis, R1-072832), Jun. 25-29, 2007, 6 pages, Orlando USA.

Alcatel-Lucent, "Signaling Resource Allocations in DL Control Channel" (3GPP TSG RAN WG1 #49bis, R1-072923), Jun. 25-29, 2007, 10 pages, Orlando USA.

QUALCOMM Europe, "Impact of Constrained Resource Signaling in PDCCH" (3GPP TSG RAN WG1 #49bis, R1-072750), Jun. 25-29, 2007, 9 pages, Orlando USA.

Nokia and Nokia Siemens Networks, "Additional Information on the Combinatorial PRB Allocation Signalling Method" (3GPP TSG RAN WG1 #49bis, R1-073217), Jun. 25-29, 2007, 4 pages, Orlando USA.

LG Electronics, "DL LVRB Assignment" (3GPP TSG RAN WG1 #49bis, R1-072877), Jun. 25-29, 2007, 4 pages, Orlando USA.

Mitsubishi Electric, "Scheduling Policy and Signaling Way on DL Resource Allocation" (3GPP TSG RAN WG1 #49bis, R1-072723), Jun. 25-29, 2007, 6 pages, Orlando USA.

Korean Intellectual Property Office, "Non-Final Rejection" for Korean Application No. 10-2010-7003226, Apr. 11, 2011, 7 pages.

United States Patent and Trademark Office, "Non-Final Rejection" for U.S. Appl. No. 12/364,992, Apr. 19, 2012, 10 pages.

Third Generation Partnership Project and Motorola, "Downlink Acknowledgment Channel", 3GPP TSG RAN1 #49 R1-072166, May 7-11, 2007, 3 pages.

Third Generation Partnership Project and Motorola, "ACK/NACK Indication for SIMO and MU-MIMO", 3GPP TSG Ran1 #48bis R1-071431, Mar. 26-30, 2007. 3 pages.

Third Generation Partnership Project et al . "ACK/NACK Signal Structure in E-UTRA Downlink", 3GPP TSG RAN WG1 #48bis R1-071656, Mar. 26-30, 2007, 5 pages.

Third Generation Partnership Project and Motorola, "PHICH Assgnment for MU-MIMO in E-UTRA", 3GPP TSG RAN1 #50bis R1-074002, Oct. 8-12, 2007, 1 page.

Patent Cooperation Treaty, "PCT Search Report and Written Opinion of the International Searching Authority" International Application No. PCT/US2008/079261, Mar. 19, 2009, 16 pages.

United States Patent and Trademark Office, "Non-Final Rejection" for U.S. Appl. No. 11/929,452, Aug. 18, 2010, 10 pages.

Korean Intellectual Property Office, "Non-Final Rejection" for Application No. 10-2010-7011837, Aug. 16, 2011, 2 pages.

Chu Rui Chang et al., "PN Offset Planning Strategies for Non-Uniform CDMA Networks," IEEE 47th Vehicular Tech. Conf., pp. 1543-1547, May 1997.

United States Patent and Trademark Office, "Non-Final Rejection" for U.S. Appl. No. 11/929,452, Jan. 19, 2012, 11 pages.

Third Generation Partnership Project and LG Electronics, "DL ACK/NACK Mapping Relations", 3GPP TSG RAN WG1 #49bis R1-072882, Jun. 25-29, 2007, 5 pages.

Third Generation Partnership Project and Motorola, "E-UTRA DL L1/L2 Invariant Control Channel Mapping", 3GPP TSG RAN WG1 #48bis R1-071812, Mar. 26-30, 2007, 3 pages.

\* cited by examiner

METHOD AND SYSTEM FOR SELECTIVE USE OF CONTROL CHANNEL ELEMENT BASED IMPLICIT POINTING

CROSS-REFERENCE TO RELATED APPLICATION

The present application claims the benefit of U.S. Provisional Application Ser. No. 60/956,334, filed Aug. 16, 2007, which is hereby incorporated by reference thereto.

BACKGROUND OF THE INVENTION

1. Field of the Invention

The claimed subject matter concerns management of acknowledgements and more particularly, management of acknowledgements through the selective use of control channel element (CCE)-based implicit pointing.

2. Description of the Related Art

There is a general move in the wireless industry towards broadband communications. In particular, LTE, which is a Third Generation Partnership Project (3GPP) standard, is the next step forward in cellular third generation (3G) services. As is known in the art, through the use of LTE, a base station can support multiple user elements (UE), or mobile stations, particularly through a technique referred to as multiple user multiple-input multiple-output (MU MIMO). In this arrangement, it may be necessary for the base station to provide acknowledgements that include positive acknowledgements (ACK) or negative acknowledgements (NACK) over a downlink (DL) channel to the UEs to allow the UEs to determine whether their transmissions to the base station were properly received.

It is desirable, however, to limit the overhead required for signaling the UEs with the DL ACKs or NACKs. One way to help minimize the use of valuable resources is to generate an ACK/NACK channel bank (ACK/NACK bank). An ACK/NACK channel bank is a set of frequency resources (resource elements also called sub-carriers or frequency bins or tones) for conveying ACK/NACK information to each scheduled UE, which are contained in the control region of a subframe in the DL channel of LTE. The UEs must refer to the ACK/NACK bank to determine whether their transmissions to the base station were properly received. Significantly, however, because of the ambiguity involved in the multiplexing of UEs on an allocated MU-MIMO resource in a subframe, it is necessary to construct and transmit on multiple ACK/NACK banks, which is a waste of valuable bandwidth.

SUMMARY OF THE INVENTION

A method for selective use of control channel element (CCE)-based implicit pointing is described herein. The method can include the step of determining whether a number of multiple user elements (UE) within a multi-user multiple-input multiple-output (MU-MIMO) group is greater than the number of resource blocks allocated to the MU-MIMO group. If the number of UEs in the MU-MIMO group is greater than the number of resource blocks allocated to the MU-MIMO group, the method can also include the step of transmitting to each of the UEs of the MU-MIMO group acknowledgements on acknowledgement channels within a first acknowledgement bank and acknowledgements on acknowledgement channels within a second acknowledgement bank. A first portion of the UEs of the MU-MIMO group can receive the acknowledgements on the acknowledgement channels within the first acknowledgement bank and a second portion of the UEs of MU-MIMO group can receive the acknowledgements on the acknowledgement channels within the second acknowledgement bank.

The method can further include the step of transmitting an uplink scheduling grant (UL SG) to one or more of the UEs in the MU-MIMO group. The UL SGs can be transmitted over physical channels that make up a physical downlink control channel (PDCCH) in which the physical channels are comprised of one or more control channel elements (CCE). The method can also include the step of transmitting an UL SG to each UE in the second portion of the MU-MIMO group.

Also, transmitting the acknowledgements on acknowledgement channels within the first acknowledgement bank can further include transmitting acknowledgements on acknowledgement channels within the first acknowledgement bank based on a location of a resource block allocated and a SDMA index assigned to the UE. The method can also include the step of sending an uplink scheduling grant to a non-MU-MIMO UE if one or more of its allocated resource blocks is within N resource blocks of the first resource block of the MU-MIMO group resource block allocation. The value N can be equal to the number of UEs in the MU-MIMO group, and the UL SG is transmitted over a physical channel that makes up a physical downlink control channel (PDCCH). The physical channel is comprised of one or more control channel elements (CCE).

The method further includes the step of transmitting an acknowledgement on an acknowledgement channel within the second acknowledgement bank. An index of a CCE of the physical channel that contained the UL SG indicates the acknowledgement channel for the non-MU-MIMO UE for receiving the acknowledgement.

In one arrangement, transmitting the acknowledgements on acknowledgement channels within the second acknowledgement bank further includes transmitting acknowledgements on acknowledgement channels within the second acknowledgement bank based on a location of a physical channel used for transmitting the UL SG. As an example, an index of a first CCE of the physical channel indicates the acknowledgement channel for a UE in the second portion of the MU-MIMO group for receiving the acknowledgements. As another example, an index of a last CCE of the physical channel indicates the acknowledgement channel for a UE in the second portion of the MU-MIMO group for receiving the acknowledgements. As yet another example, an index of a CCE of the physical channel that contained the UL SG indicates the acknowledgement channel for a UE in the second portion of the MU-MIMO group for receiving the acknowledgements.

At a user element (UE) that is part of a multi-user multiple-input multiple-output (MU-MIMO) group, another method for selective use of CCE-based implicit pointing is also described herein. The method can include the steps of receiving from a base station over a physical channel a UL SG that contains information relating to allocation of resource blocks when the number of resource blocks of the MU-MIMO allocation is less than an index provided in the UL SG, and in response, transmitting data to the base station in accordance with the resource block allocation. The method can also include the step of receiving from the base station acknowledgements on acknowledgement channels within a first acknowledgement bank and acknowledgements on acknowledgement channels within a second acknowledgement bank and determining the appropriate acknowledgement channel based on a location of the physical channel used for the UL SG.

The method can further include the step of determining the acknowledgement bank based on whether the index provided in the UL SG is greater than the number of resource blocks in the MU-MIMO group allocation. As an example, the physical channel is part of a physical downlink control channel (PD-CCH), wherein the physical channel is comprised of one or more control channel elements (CCE).

In one arrangement, an index of a first CCE of the physical channel indicates the acknowledgement channel for the UE of the MU-MIMO group for receiving the acknowledgements. In another arrangement, an index of a last CCE of the physical channel indicates the acknowledgement channel for the UE in the MU-MIMO group for receiving the acknowledgements. In yet another arrangement, an index of a CCE of the physical channel that contained the UL SG indicates the acknowledgement channel for the UE of the MU-MIMO group for receiving the acknowledgements.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION

Figure 1:
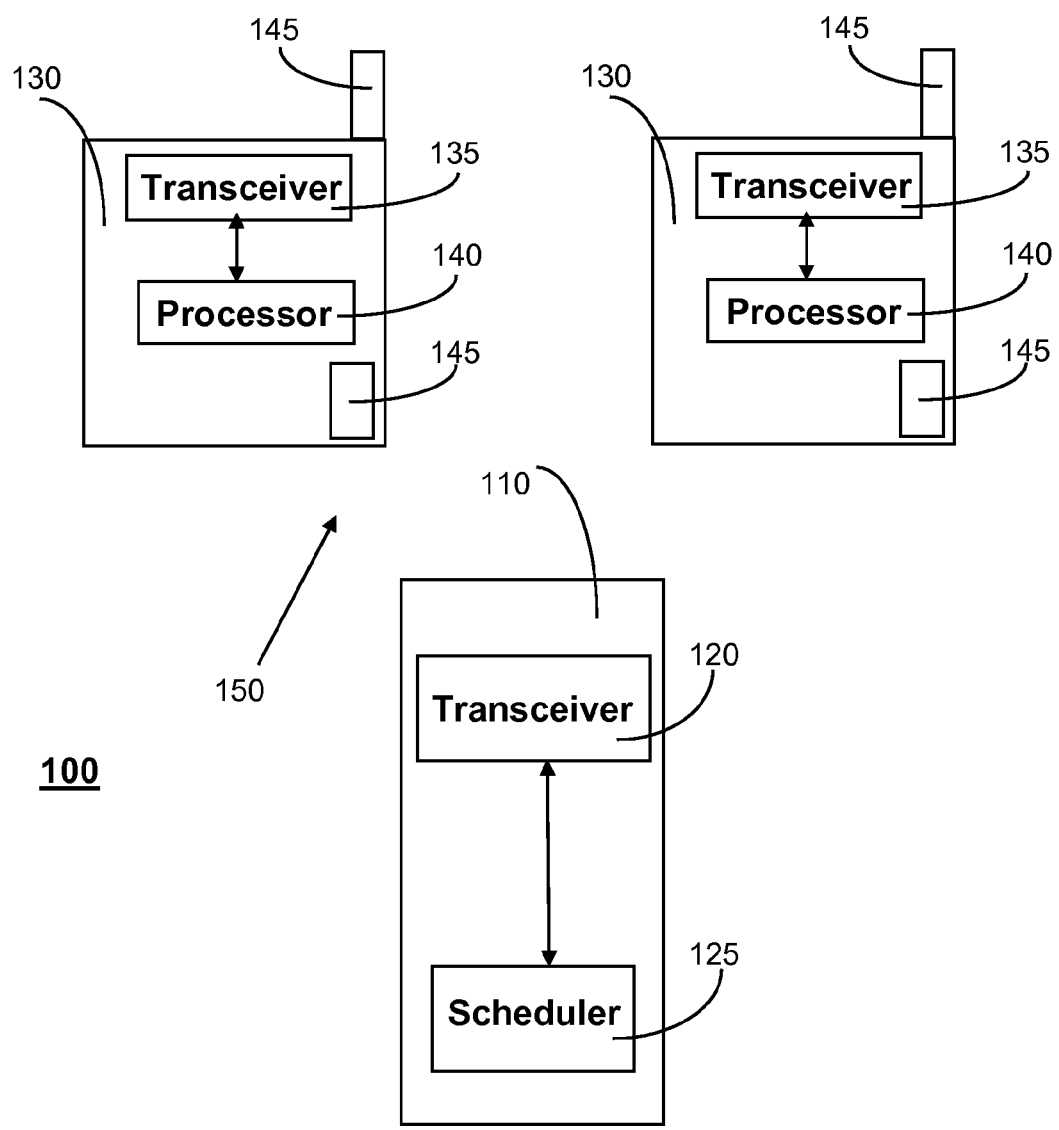
FIG. 1 illustrates an example of a MU-MIMO communication system.

While the specification concludes with claims defining the features of the invention that are regarded as novel, it is believed that the invention will be better understood from a consideration of the following description in conjunction with the drawings, in which like reference numerals are carried forward.

As required, detailed embodiments of the claimed subject matter are disclosed herein; however, it is to be understood that the disclosed embodiments are merely exemplary and can be embodied in various forms. Therefore, specific structural and functional details disclosed herein are not to be interpreted as limiting, but merely as a basis for the claims and as a representative basis for teaching one skilled in the art to variously employ the claimed subject matter in virtually any appropriately detailed structure. Further, the terms and phrases used herein are not intended to be limiting but rather to provide an understandable description.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled" as used herein, are defined as connected, although not necessarily directly, and not necessarily mechanically. The term "user element" can be any portable component or group of portable components that are capable of receiving and/or transmitting communications signals. A "base station" can be any infrastructure component that is capable of exchanging wireless signals with a user element.

A "transceiver" can be any component or group of components that are capable of receiving or transmitting wireless signals over a suitable medium. The term "data" can mean any type of information that can be transmitted over a wireless medium. A "scheduler" can include any component or group of components that are capable of allocating resources in accordance with the description herein using any suitable form of hardware, software or combination thereof. A "processor" can be defined as a component or a group of components that can process allocation information from a base station in accordance with the description herein using any suitable form of hardware, software or combination thereof.

The term "uplink" can refer to transmissions from a user element to a base station, while the term "downlink" can refer to transmissions from a base station to a user element. Further, the term "multiple-input multiple-output" refers to a system or technique in which multiple transmit antennas and multiple receiver antennas are deployed. A "multi-user multiple input multiple output communication system" means a wireless communication system in which a plurality of UEs are allowed to transmit over the same time-frequency resources. An "acknowledgement" can mean any indication as to whether a transmitted signal was correctly received. Also, an "acknowledgement channel" can mean any medium that conveys acknowledgements.

A method and system for resource allocation in a MU-MIMO communication system is described herein. The method can include the step of transmitting to multiple UEs over a DL channel a UL SG that includes information relating to allocation of resource blocks in which the multiple UEs form a MU-MIMO group. Each UE of a MU-MIMO group can receive its own unique UL SG for the first packet transmission. The method can also include the steps of receiving from the UEs over a UL channel data in accordance with the resource block allocation and in response to receiving the data, transmitting acknowledgements on acknowledgement channels within a single acknowledgement bank to the UEs that give an indication as to whether the data was received correctly. This process reduces DL overhead and simultaneously preserves DL bandwidth in view of the single acknowledgement bank, as compared with systems requiring multiple acknowledgement banks.

Referring to FIG. 1, a MU-MIMO communication system 100 that operates in accordance with the LTE standard is shown in which a base station 110 is in wireless communications with a plurality of UEs 130. In particular, the base station 110 can communicate with the UEs 130 over a DL channel using the orthogonal frequency division multiple access (OFDMA) modulation scheme. Moreover, the UEs 130 can communicate with the base station 110 over an uplink channel using the single carrier-frequency division multiple access (SC-FDMA) technique. It is understood, however, that the claimed subject matter is not necessarily limited to these examples, as other suitable modulation schemes and protocols may be utilized.

The base station 110 can include a transceiver 120 and a scheduler 125, which can be coupled to one another. In addition, the UEs 130 can include a transceiver 135 and a processor 140 coupled to the transceiver 135. If desired, the UEs 130 may also include multiple antennas 145, which can form part of a MIMO system. In one arrangement, the transceiver 120 can transmit to the UEs 130 over a DL channel an UL SG that includes information relating to the allocation of resource blocks. The scheduler 125 can generate the UL SG. Subsequently, the UEs 130 may transmit data to the base station 110 in accordance with the resource block allocation set forth by the UL SG. In response to receiving the data, the scheduler 125 can generate acknowledgements on acknowledgement channels within an acknowledgement bank, which the transceiver 120 can transmit to the UEs 130. The UEs 130 can rely on this transmission to determine whether the base station 110 correctly received the previously-transmitted data.

As is known in the art, UEs 130 that are employed in a MU-MIMO system may share or be multiplexed on common allocation resources. Thus, the UEs 130 may form a MU-MIMO group 150. For purposes of this description, a MU-MIMO group can mean a set of two or more UEs that are multiplexed on common time-frequency resources. In one particular arrangement, a MU-MIMO group can contain at least four UEs. As will be explained below, the processes described herein may accommodate any ambiguities that may exist in a MU-MIMO group with respect to the channel assignments in the acknowledgement bank.

Figure 2:
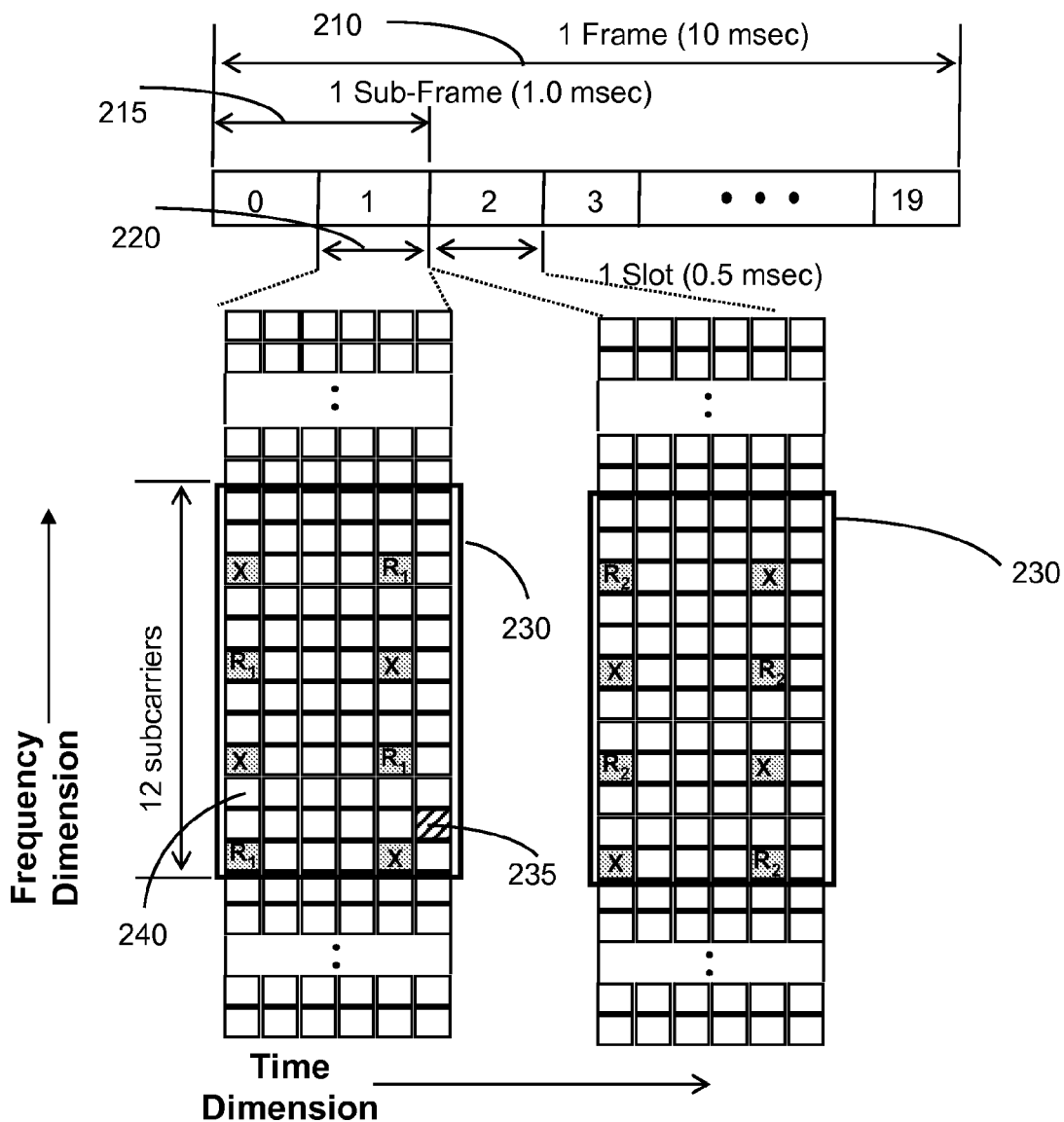
FIG. 2 illustrates an example of a resource block.

Referring to FIG. 2, an example of several resource blocks 230 are shown. As is known in the art, a resource block is a time-frequency allocation that is assigned to a UE and can be defined as the smallest element of resource allocation assigned by a scheduler, such as the scheduler 125 of the base station 110. The resource block 230 may extend over a slot 220, which can be about 0.5 milli-seconds (msec) long and can be part of a subframe 215, which may be approximately 1.0 msec in duration. The resource block 230 may include six or seven symbols, depending on the type of cyclic prefix that is used, and the resource block 230 may include twelve sub-carriers 240. In this example, normal cyclic prefix is employed, and as such, six symbols are contained in the resource block 230. In this example, the DL bandwidth can be about five MHz, which results in twenty-five resource blocks 230. It must be noted, however, that the claimed subject matter is not limited to this particular bandwidth, as it may apply to other suitable ranges.

The resource block 230 can be comprised of several resource elements 235, which can represent a single sub-carrier 240 for a period of one symbol. As is known in the art, reference symbols can be periodically transmitted, such as every sixth sub-carrier 240 and can be staggered in both time and frequency. This pattern is for DL transmissions. These reference symbols are represented in the resource blocks 230 as shaded resource elements designated with the letter "R" (with appropriate subscript numbers) and can be used to estimate channel response on the remaining sub-carriers 240. As is known in the art, for a MIMO system in which multiple antennas are employed, each resource block 230 can include reference symbols that are assigned to a particular antenna. For example, the resource block 230 on the left includes reference symbols $R_1$ for a first transmitting antenna, while the resource block 230 on the right includes reference symbols $R_2$ for a second transmitting antenna. The resource elements 235 designated with an "X" denotes an unused resource element 235 for that particular resource block 230 in view of the multiple reference signals being transmitted from the other antennas.

The sequential transmission of the reference symbols and the nulling of the other reference symbols not assigned to the transmitting antenna can be referred to as a demodulation reference symbol (DRS) format for the DL. For example, the DRS format for the resource block 230 on the left of FIG. 2 can have a value of "0," while the DRS format for the block 230 on the right can have a value of "1." As will be explained later, for UL transmissions, reference symbols can be transmitted on the fourth symbol of each slot.

Figure 3:
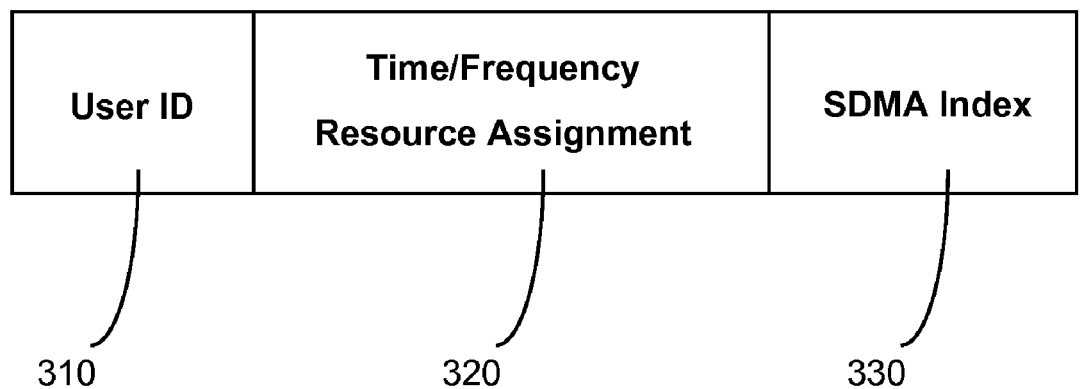
FIG. 3 illustrates an example of a UL SG.

Referring to FIG. 3, an example of a UL SG 300 is shown. As is known in the art, the UL SG 300 can be transmitted over a DL channel to the UEs 130 (see FIG. 1) and can include resource allocation that can be used by the UEs 130 for transmitting data to the base station 110. As such, a UL SG can be defined as any element that can carry information relating to resource allocation. In one arrangement, the UL SG 300 can include a user identification (ID) block 310, a time/frequency resource assignment block 320 and a space-division multiple access (SDMA) index 330. The user ID block 310 identifies the appropriate UEs 130, and the time/frequency resource assignment block 320 enables the UEs 130 to determine which resources to use for transmitting data on the relevant UL channel. As will be explained below, the SDMA index 330 can point to a particular DRS format (see FIG. 5) with unique cyclic shift so DRS uplink transmissions by each UE 130 of the MU-MIMO group are orthogonal.

Figure 4:
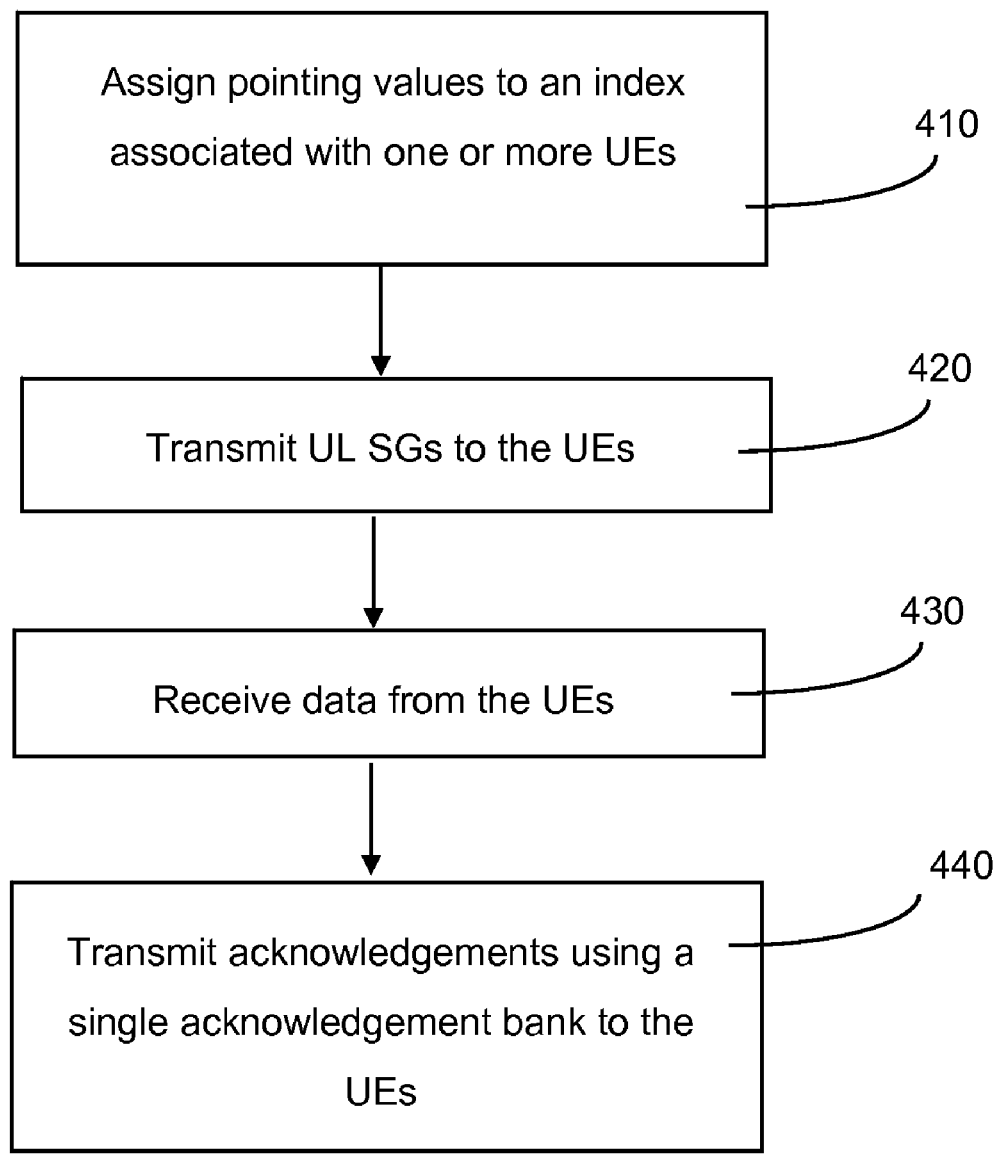
FIG. 4 illustrates an exemplary method for resource allocation in a MU-MIMO communication system.
Figure 5:
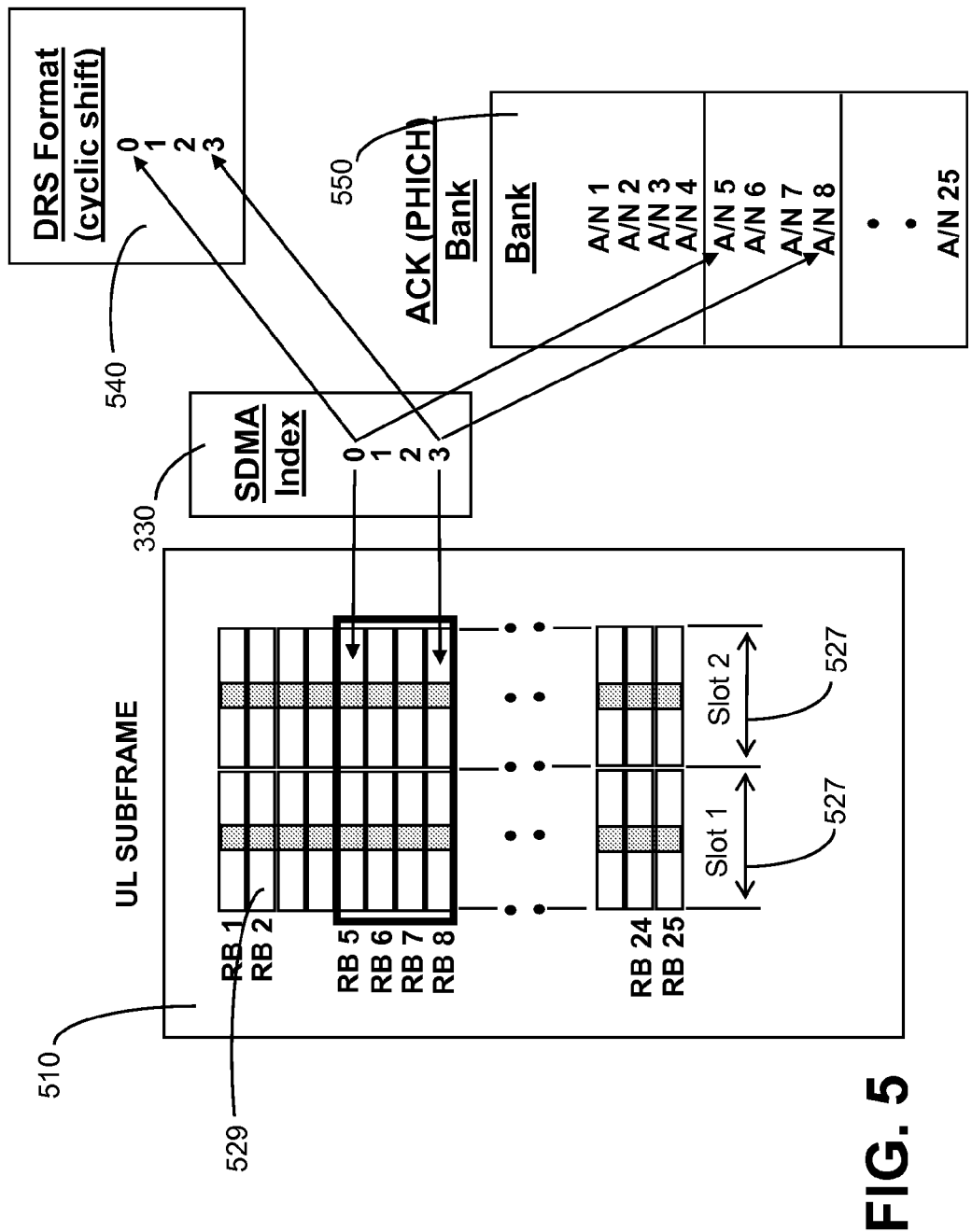
FIG. 5 illustrates examples of a UL subframe, an SDMA index, a DRS format block and an acknowledgement bank.

Referring to FIG. 4, a method 400 for resource allocation is shown. To describe this method 400, reference will be made to FIGS. 1-3, although it must be understood that the method 400 can be practiced in any other suitable system or component using any other suitable modulation scheme or protocol. Reference will also be made to FIG. 5, which shows an example of the process described in the method 400. The steps of the method 400 are not limited to the particular order in which they are presented in the figures. Moreover, any of these methods can have a greater number of steps or a fewer number of steps than those shown in the figures.

At step 410, pointing values can be assigned to an index associated with one or more UEs, and at step 420, a UL SG can be transmitted to multiple UEs over a DL channel (i.e., a distinct UL SG is transmitted to each UE). Data may then be received over an UL channel in accordance with the UL SG, as shown at step 430. For example, the base station 110 can assign pointing values to the UEs 130 that make up a MU-MIMO group 150, and these pointing values can be contained in the SDMA index 330. As a more particular example, four UEs 130 may form a MU-MIMO group 150, and the base station 110 can assign values from the set 0, 1, 2 and 3 to the UEs 130, as shown in the SDMA index 330 of FIG. 5. The base station 110 can arbitrarily assign these values to the UEs 130 or can assign them based on a preferred DRS format for one or more of the UEs 130.

Subsequently, the base station 110 can transmit over a DL channel to the UEs 130 of the MU-MIMO group 150 the UL SG 300. As noted earlier, the UL SG 300 can include information relating to resource allocation, such as the allocation of resource blocks 230. Once they receive the UL SGs 300, the UEs 130 may transmit data to the base station 110 in accordance with the resource block 230 allocation of the UL SGs 300, which the base station 110 can receive and process, assuming suitable channel conditions. In this particular example, the four UEs 130 of the MU-MIMO group 150 can be allocated four resource blocks 230, which are designated as RBs 5-8 in the UL subframe 510 of FIG. 5. This resource sharing, as is known in the art, is associated with MU-MIMO communication systems.

Moreover, the SDMA index 330 can point to the DRS format 540 for a particular UE 130 of the MU-MIMO group 150. As explained above, for UL transmissions, reference symbols can be transmitted on the fourth symbol of each slot, which is represented by the shaded vertical section in the UL subframe 510. To avoid interference in view of the multiplexing of the UEs 130, the DRS format 540 can indicate a cyclic shift to be employed by the UEs 130. For example, a UE 130 with an assigned value of "0" in the SDMA index 330 can determine that its DRS format 540 will also be "0," which is indicated in FIG. 5. This assignment corresponds to a cyclic shift of "0" of a known pattern for transmission as the reference symbols. Similarly, a UE 130 with an assigned value of "1" in the index 330 can determine that its DRS format will be "1," as well.

Referring back to FIG. 4, at step 440, in response to receiving the data, acknowledgements on acknowledgement channels within a single acknowledgement bank can be transmitted to the UEs, which can provide an indication as to whether the data was correctly received. For example, once the base station 110 receives the data, the scheduler 125 can generate acknowledgements, which can be transmitted over acknowledgement channels within the acknowledgment bank 550 to the UEs 130 of the MU-MIMO group 150. An acknowledgement bank, which may also be referred to as a physical HARQ indicator channel (PHICH) bank, can be defined as any element that can include indications as to whether a particular transmission was correctly received. In this example, the acknowledgement bank 550 can include a set of channels that carry ACKs or NACKs. Because there are twenty-five resource blocks 230 in this example, the acknowledgement bank 550, as shown in FIG. 5, may also include twenty-five acknowledgement channels, which refer to the transmissions from the UEs 130. These acknowledgement channels may also be referred to as PHICHs.

As described above, sharing resources is common in MU-MIMO systems. As such, there may be some ambiguity in the UEs 130 determining which location (i.e., channel) in the acknowledgement bank 530 applies to a particular UE 130. That is, the UEs 130 that are sharing the resource blocks 230 labeled RB 5 through RB 8 may not be sure which of the acknowledgment channels 5-8 to monitor in the acknowledgement bank 550.

To overcome this drawback, the multiplexed UEs 130 in the MU-MIMO group 150 may refer to the SDMA index 330 and the allocation of resource blocks 230 to determine which channel in the acknowledgement bank 550 to monitor for the acknowledgements. As an example, in this case, it is known from the UL SG 300 that the resource blocks 5-8 have been allocated to this particular MU-MIMO group. The UEs 130 can then add the value 5, which represents the first resource block in the allocation, and add it to its unique value from the SDMA index 330 to determine the appropriate channel in the acknowledgement bank 550. For example, the UE 130 assigned with the value 0 in the SDMA index 330 can combine this value with the value 5 to determine that its assigned acknowledgement channel in the bank 550 is channel A/N 5. In a similar fashion, the UE 130 with a value of 1 in the index 330 can determine that its assigned channel is A/N 6, or value 1 plus value 5. Although the first resource block in the allocation can serve as the reference point for determining the channels, it must be noted that the invention is not so limited, as the second or subsequent resource blocks can serve this function.

To carry out the process described above, the number of resource blocks 230 in the resource block allocation can be greater than or equal to the number of UEs 130 in the MU-MIMO group 150. For example, because the MU-MIMO group 150 described here contained four multiplexed UEs 130, the number of resource blocks 230 allocated to the MU-MIMO group 150 can be greater than or equal to four. This constraint can ensure that there is a one-to-one mapping of the SDMA index 330 with the appropriate acknowledgement channels in the acknowledgement bank 550, which limits the necessary acknowledgement banks 550 to one.

The processes described above also support both adaptive HARQ and non-adaptive HARQ transmissions from the UEs 130. An adaptive HARQ re-transmission receives an UL SG to indicate a change compared to the UL SG received for the first packet transmission or previous re-transmission. The change might be changes to the resource allocation or modulation and coding scheme or some other control attribute. A non-adaptive HARQ re-transmission does not receive an UL SG and relies on the information receive from the UL SG corresponding to the first transmission of the packet or a previous re-transmission of the current packet.

As noted above, the constraint of limiting the number of allocated resource blocks 230 to a value that is equal to or greater than the number of multiplexed UEs 130 in a MU-MIMO group 150 is useful for employing the SDMA index 330 as an implicit pointer to guide the UEs 130 in determining which channel of the acknowledgement bank 550 to monitor. There may be certain instances, however, in which the number of multiplexed UEs 130 is actually greater than the number of allocated resource blocks 230. In this case, it may be helpful for a certain number of the multiplexed UEs 130 to rely on the processes described above to determine the proper acknowledgement channel to monitor. For the remaining UEs 130, an alternative technique can be used to guide them in correctly locating their acknowledgement channels.

Figure 6:
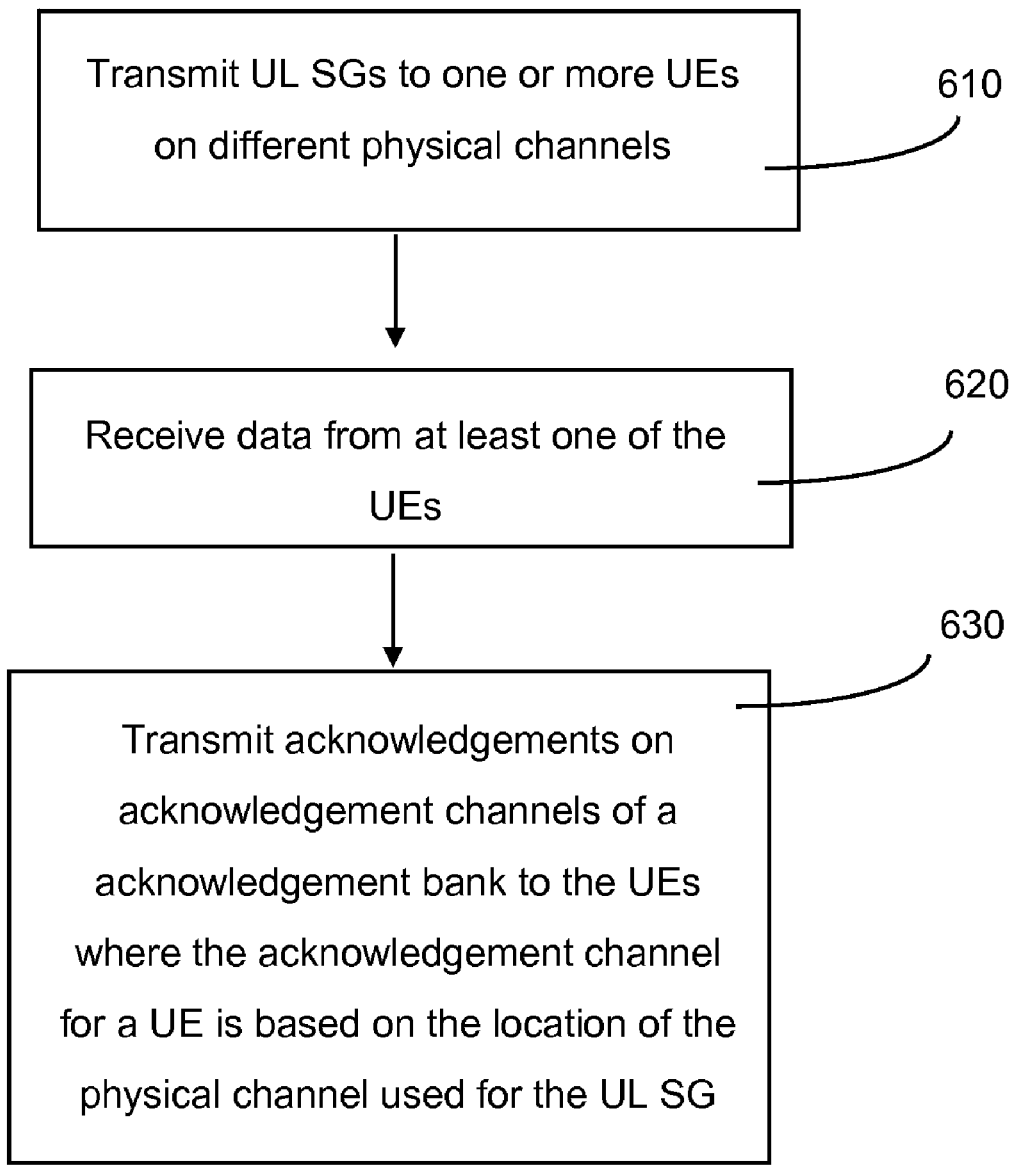
FIG. 6 illustrates a method of the selective use of CCE-based implicit pointing.
Figure 7:
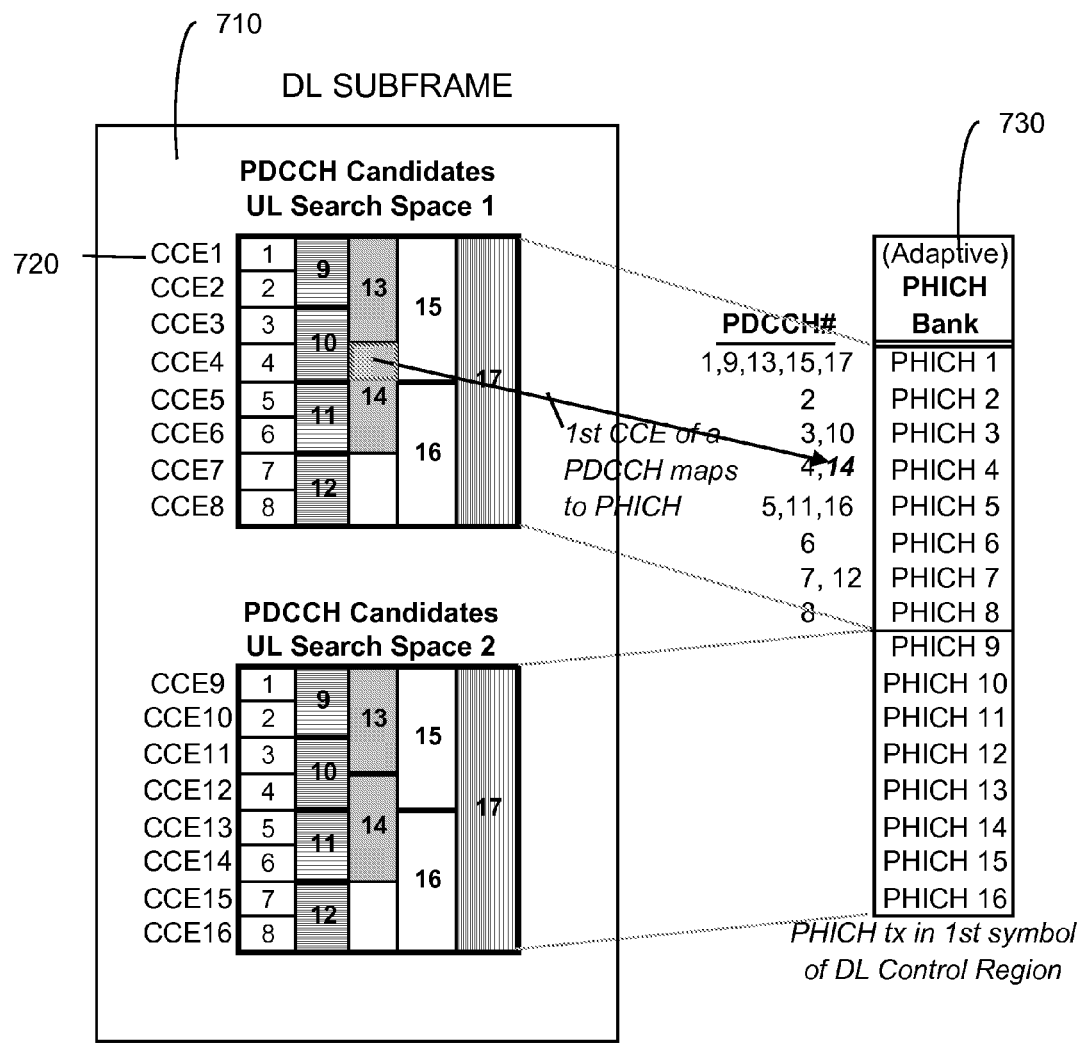
FIG. 7 illustrates an example of CCE-based implicit pointing.
Figure 8:
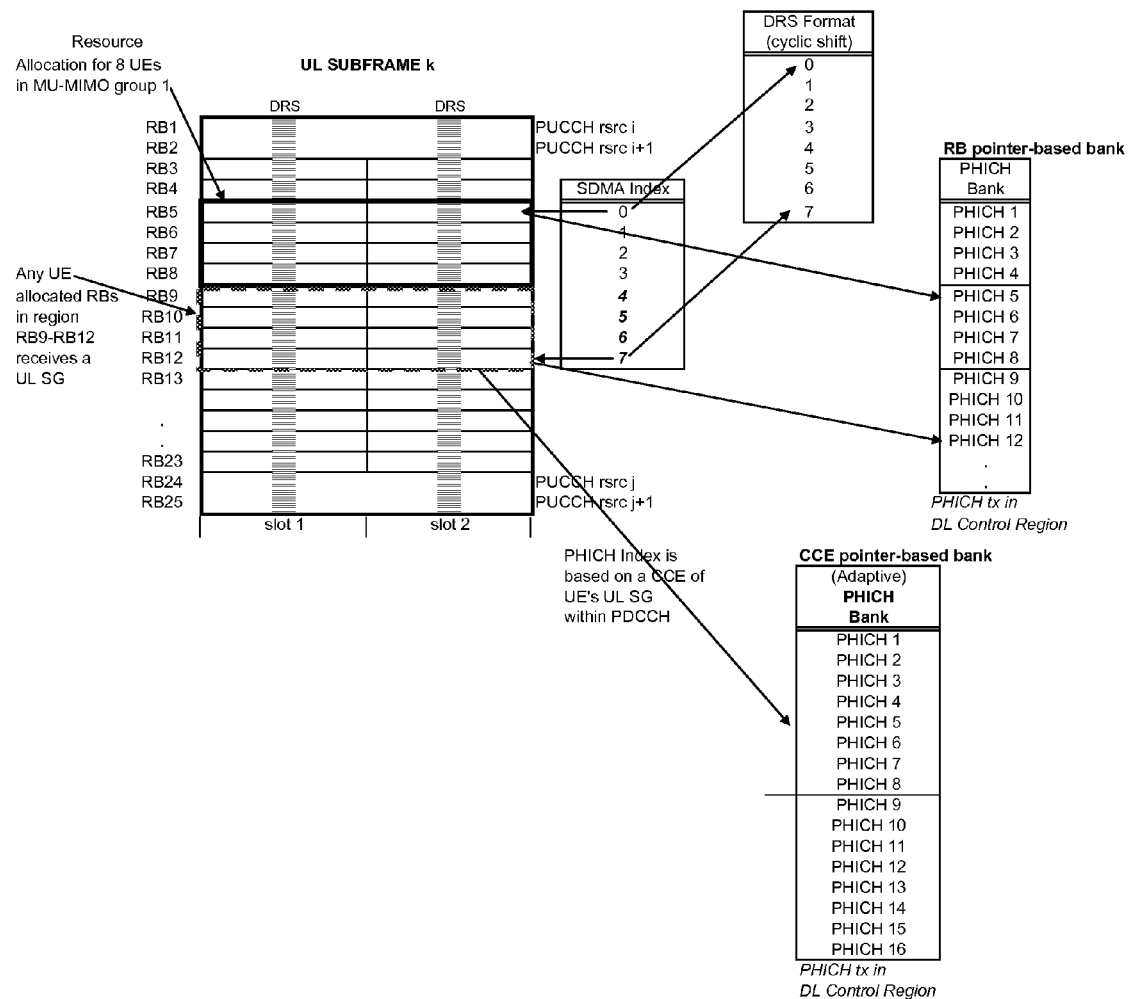
FIG. 8 illustrates an example of resource allocation and downlink acknowledgement transmission.

Referring to FIG. 6, a method 600 for selective use of CCE-based implicit pointing is shown. To describe this method 600, reference may be made to the other drawings herein, although it must be understood that the method 600 can be practiced in any other suitable system or component using any other suitable modulation scheme or protocol. Reference may also be made to FIGS. 7 and 8, which show examples of the processes described in the method 600. The steps of the method 600 are not limited to the particular order in which they are presented in the figures. Moreover, any of these methods can have a greater number of steps or a fewer number of steps than those shown in the figures.

In step 610 a base station transmits UL SG scheduling grants are transmitted to one or more UEs on different physical channels of a Physical DL control channel (PDCCH) on a DL sub-frame. The UEs can be subset of the UEs in the MU-MIMO group. The PDCCH (710 in FIG. 7) may consist of different time-frequency resource elements which may be grouped to form a control channel element (CCE). The physical channel can consist of one or more CCEs. FIG. 7 shows an example of 17 different possible physical channels obtained by combining different number of CCEs from a set of 8 CCEs. Physical channels are assigned to UEs on the PDCCH such that there is no overlap between the physical channels of any two UEs.

In response to the UL SG, the base station, in step 620, receives data of the allocated resource blocks from at least one of the UEs. The base station then in response to the received data transmits acknowledgements on acknowledgement channels of a acknowledgement bank (PHICH bank, FIG. 7, 730) to the UEs in step 620. The acknowledgement channel used for transmitting the acknowledgement for a UE is based on the location of the physical channel used for transmitting the UL SG for the UE in step 610. In one embodiment, the index of the first CCE of the physical channel used for transmitting UL SG to the UE indicates the acknowledgment channel to use in the acknowledgment bank.

For example in FIG. 7, CCE 1 (720 in FIG. 7) is associated with acknowledgment channel, PHICH 1, while CCE 2 is associated with acknowledgment channel, PHICH 2, CCE 3 is associated with acknowledgment channel, PHICH 3. The first CCE of the physical channels 1, 9, 13, 15, 17 is CCE1 and thus the PHICH 1 is the acknowledgment channel used for the UE that was transmitted UL SG on any one of these physical channel 1, 9, 13, 15, or 17. Similarly, acknowledgment channel PHICH 4 within the acknowledgment bank is used for transmitting the acknowledgement for the UE that was transmitted UL SG on physical channel 4 or 14 (CCE4 is the first CCE of physical channel 4, 14 and is associated with acknowledgment channel, PHICH 4). Thus, pointing to acknowledgment channels on a acknowledgment bank is based on location of the physical channel and in turn on the CCEs used.

In one embodiment, the size of the acknowledgment bank may be approximately equal to the number of possible CCEs in the PDCCH. In another embodiment the size of the acknowledgment bank is approximately equal to the sum of the number of possible CCEs in the PDCCH in each PDCCH candidate uplink search region supported in a given subframe or supported by the network. A multi-user multiple-input multiple-output (MU-MIMO) communication system may use resource allocation of FIG. 4 or FIG. 6 or a combination thereof.

In one embodiment when the number of UEs in the MU-MIMO group is greater than the number of RBs allocated in the MU-MIMO group resource allocation acknowledgements are transmitted to a subset of UEs using RB based PHICH bank and to another subset of UEs using CCE based PHICH bank.

In another embodiment, the SDMA index can be used to indicate which CCE-based PHICH bank (given multiple CCE-based PHICH banks and no RB based PHICH banks) to use or the SDMA index can be used as an offset to drop down to a lower part of the CCE-based PHICH bank. This allows for only CCE-based pointing. In one embodiment, if a UE's SDMA index is greater than the number of RBs in the MU-MIMO resource allocation then an offset is added to a CCE pointer to locate a portion of the CCE-based PHICH bank. The CCE-based PHICH bank size may be extended in this case. The offset could be equal to the total number of CCEs allocated for the PDCCHs used for UL SGs (e.g. 8 CCEs maybe allocated for UL SGs for a 5 MHz LTE carrier and hence there 8 PHICHs would be needed). In another embodiment a parameter value A is determined were A='SDMA index-Last RB index in MU-MIMO resource allocation' when a UE's SDMA index is greater than the number of RBs in the MU-MIMO resource allocation and then use value of A to determine which CCE-based PHICH bank to access (for example, each bank may be of size 8 for the 5 MHz LTE carrier). Multiple CCE-based banks can be viewed as one large CCE-based bank. For example, the size of the one large CCE-based bank can be larger than the total number of CCEs allocated for all UL SG PDCCHs in a given subframe.

Another embodiment for resource allocation and downlink acknowledgement transmission is shown in FIG. 8. In FIG. 8, a base station transmits uplink scheduling grants to MU-MIMO UEs in a MU-MIMO group indicating a MU-MIMO resource allocation for each UE's first packet transmission. UEs in the MU-MIMO group use the CCE pointer-based PHICH bank for locating its acknowledgement channel (PHICH) whenever they receive a scheduling grant otherwise they use the RB pointer-based PHICH bank.

Also indicated by the UL SG is a SDMA index, which is used to determine the DRS format (cyclic shift) and when added, for example, to the first resource block index in the MU-MIMO resource allocation determines the PHICH index in the RB-pointer based PHICH bank which is used to locate the acknowledgement channel (PHICH) for retransmissions that did not have a corresponding UL SG. For retransmissions the base station does not send uplink scheduling grants to MU-MIMO UEs and the MU-MIMO UEs use the PHICH index determined from the previous UL SG. UL SGs are sent to a UE not in the MU-MIMO group (e.g., non-MU-MIMO UE or MU-MIMO UE in another MU-MIMO group) if one or more of its allocated resource blocks is within N resource blocks of the first resource block of the MU-MIMO group resource block allocation. The value N can be equal to the number of UEs in the MU-MIMO group, and the UL SG is transmitted over a physical channel that makes up a physical downlink control channel (PDCCH). The physical channel is comprised of one or more control channel elements (CCE).

In the example of FIG. 8. N is equal to 8. The acknowledgement channel used for transmitting acknowledgements to a UE was sent an uplink scheduling grant based on the location physical channel used for transmitting the uplink scheduling grant in the PDCCH. In one embodiment, the index of the first CCE of the physical channel used for transmitting UL SG to the UE indicates the acknowledgment channel to use in the CCE pointer-based PHICH (acknowledgment) bank.

While the above examples have been described in terms of downlink transmissions, those of skill in the art will appreciate that they can also apply to uplink communications. Moreover, it is understood that the claimed subject matter is not limited to any of these examples, as there may be other techniques that can be performed to appreciate power savings from the information provided by the power status messages.

While the various embodiments of the have been illustrated and described, it will be clear that the claimed subject matter is not so limited. Numerous modifications, changes, variations, substitutions and equivalents will occur to those skilled in the art without departing from the spirit and scope of the present invention as defined by the appended claims.

What is claimed is:

1. A method for selective use of control channel element (CCE)-based implicit pointing, the method comprising:
   determining whether a number of multiple user elements (UEs) assigned common time-frequency resources is greater than a number of resource blocks in the common time-frequency resources;
   if the number of UEs assigned the common time-frequency resources is greater than the number of resource blocks in the common time-frequency resources, transmitting to each of the UEs assigned the common time-frequency resources acknowledgements on acknowledgement channels within a first acknowledgement bank and acknowledgements on acknowledgement channels within a second acknowledgement bank;
   wherein a first portion of the UEs assigned the common time-frequency resources receives the acknowledgements on the acknowledgement channels within the first acknowledgement bank and a second portion of the UEs assigned the common time-frequency resources receives the acknowledgements on the acknowledgement channels within the second acknowledgement bank.

2. The method according to claim 1, further comprising:
   transmitting an uplink scheduling grant (UL SG) to one or more of the UEs assigned the common time-frequency resources, wherein the UL SGs are transmitted over physical channels that make up a physical downlink control channel (PDCCH), wherein the physical channels have one or more control channel elements (CCE).

3. The method according to claim 2, further comprising:
transmitting an UL SG to each UE in the second portion of the common time-frequency resources.

4. The method according to claim 1, wherein the transmitting to each of the UEs assigned the common time-frequency resources further comprises:
transmitting acknowledgements on acknowledgement channels within the first acknowledgement bank based on a location of a resource block allocated to the UE and a SDMA index assigned to the UE.

5. The method according to claim 1, further comprising:
sending an uplink scheduling grant (UL SG) to a UE not assigned the common time-frequency resources if one or more resource blocks allocated to the UE is within N resource blocks of a first resource block of the common time-frequency resources, wherein N is equal to the number of UEs assigned the common time-frequency resources and wherein the UL SG to the UE is transmitted over a physical channel that makes up a physical downlink control channel (PDCCH), wherein the physical channel has one or more control channel elements (CCE).

6. The method according to claim 5, further comprising:
transmitting an acknowledgement to the UE on an acknowledgement channel within the second acknowledgement bank.

7. The method according to claim 6, wherein an index of a CCE of the physical channel that contained the UL SG indicates the acknowledgement channel for the UE to receive the acknowledgement.

8. The method according to claim 2, wherein the transmitting to each of the UEs assigned the common time-frequency resources further comprises:
transmitting acknowledgements on acknowledgement channels within the second acknowledgement bank based on a location of a physical channel used for transmitting the UL SG.

9. The method according to claim 8, wherein an index of a first CCE of the physical channel indicates the acknowledgement channel for a UE in the second portion of the common time-frequency resources.

10. The method according to claim 8, wherein an index of a last CCE of the physical channel indicates the acknowledgement channel for a UE in the second portion of the common time-frequency resources.

11. The method according to claim 8, wherein an index of a CCE of the physical channel that contained the UL SG indicates the acknowledgement channel for a UE in the second portion of the common time-frequency resources.

12. At a user element (UE) that is assigned common time-frequency resources, a method for selective use of CCE-based implicit pointing, the method comprising:
receiving from a base station over a physical channel an uplink scheduling grant (UL SG) that contains information relating to a resource block allocation when a number of resource blocks in the common time-frequency resources is less than an index provided in the UL SG;
in response, transmitting data to the base station in accordance with the resource block allocation;
receiving from the base station acknowledgements on acknowledgement channels within a first acknowledgement bank and acknowledgements on acknowledgement channels within a second acknowledgement bank; and
determining an appropriate acknowledgement channel based on a location of the physical channel used for the UL SG.

13. The method according to claim 12, further comprising:
determining whether to use the first acknowledgement bank or the second acknowledgement bank based on whether the index provided in the UL SG is greater than the number of resource blocks in the common time-frequency resources.

14. The method according to claim 12, wherein the physical channel is part of a physical downlink control channel (PDCCH), wherein the physical channel has one or more control channel elements (CCE).

15. The method according to claim 14, wherein an index of a first CCE of the physical channel indicates the acknowledgement channel for the UE.

16. The method according to claim 14, wherein an index of a last CCE of the physical channel indicates the acknowledgement channel for the UE.

17. The method according to claim 14, wherein an index of a CCE of the physical channel indicates the acknowledgement channel for the UE.

* * * * *